Dec. 1, 1925.                J. D. PETERS ET AL                1,563,920
                                  SNOWPLOW
                         Filed March 13, 1925        2 Sheets-Sheet 1
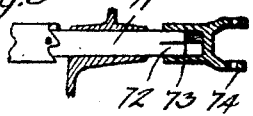
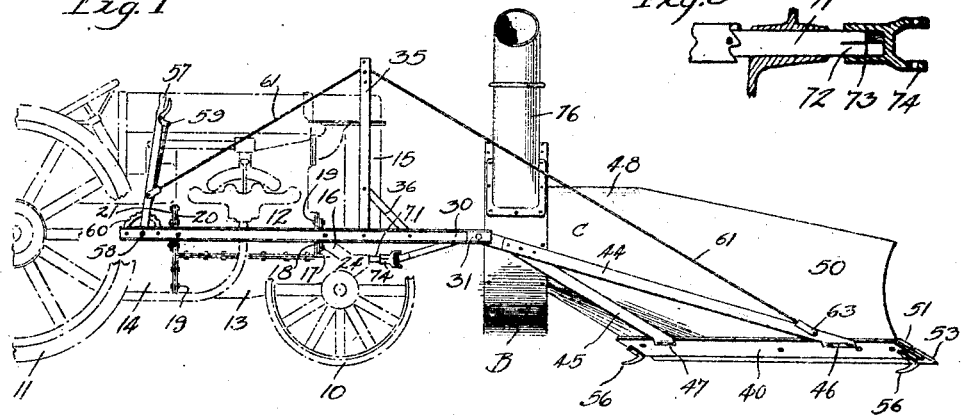
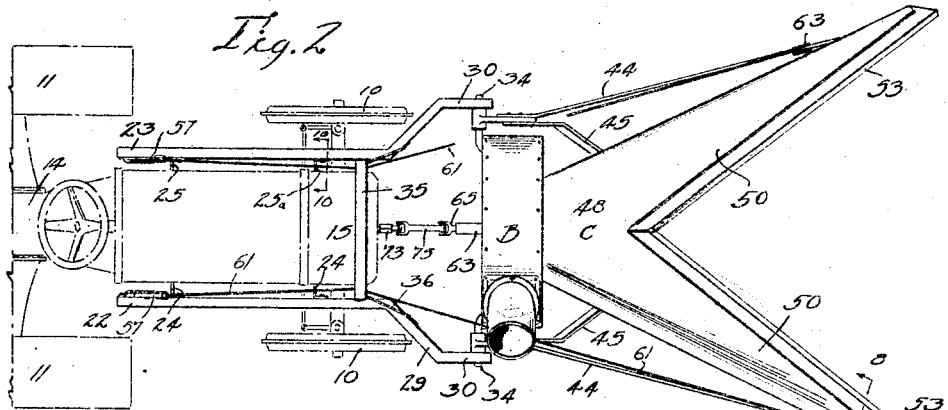
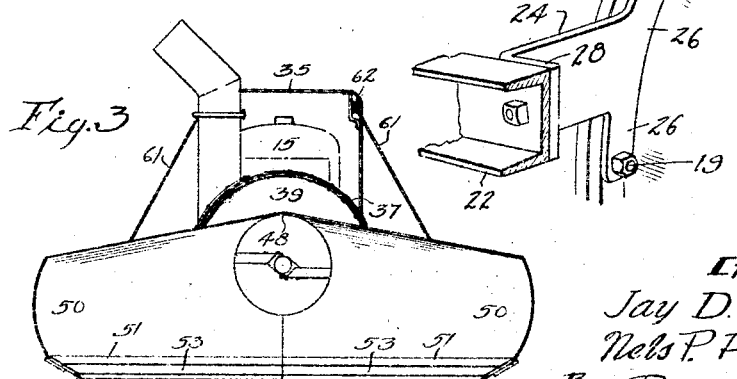
Inventors
Jay D. Peters
Nels P. Pallesen

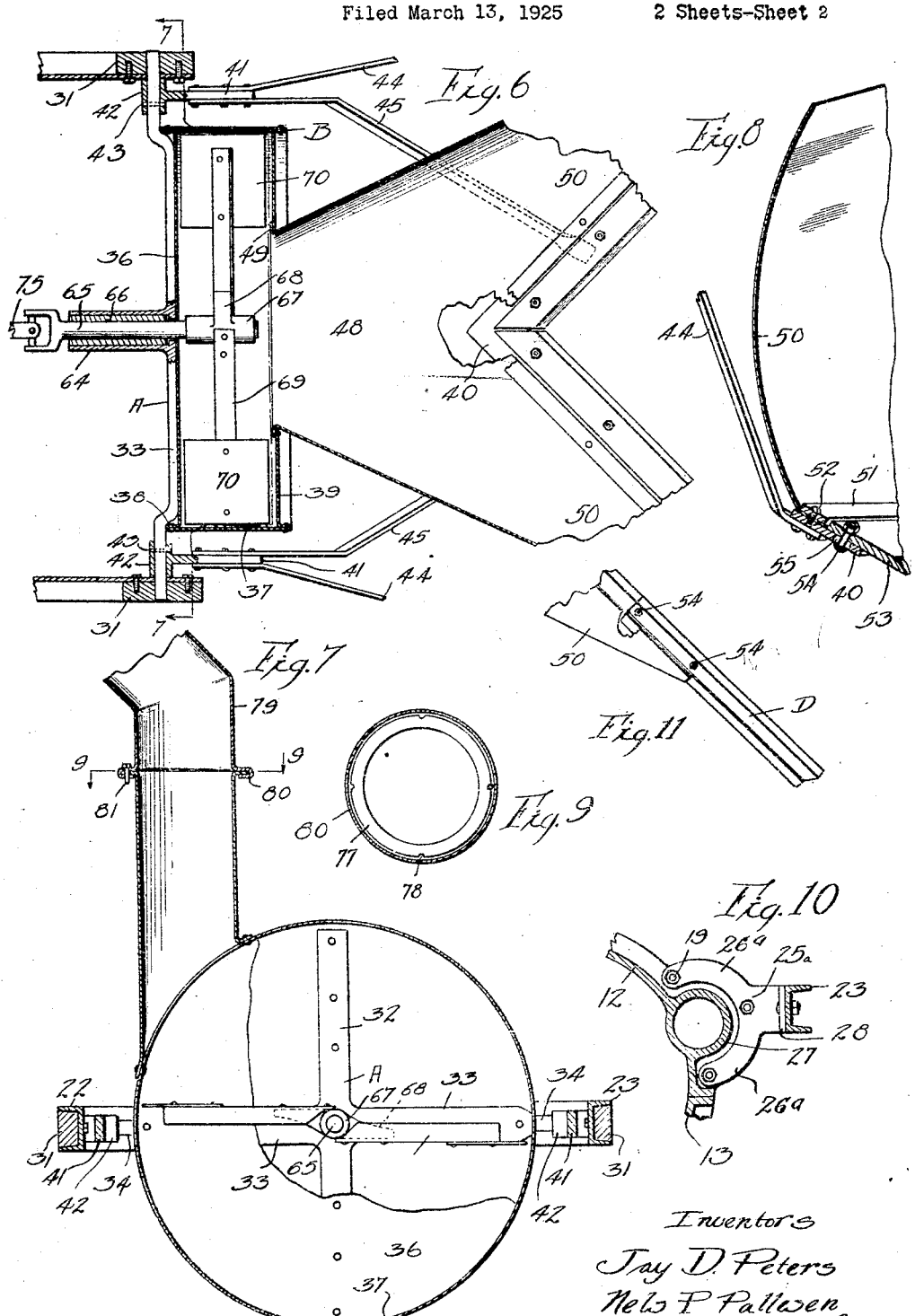

Patented Dec. 1, 1925.

UNITED STATES PATENT OFFICE.

JAY D. PETERS AND NELS P. PALLESEN, OF MARCUS, IOWA.

SNOWPLOW.

Application filed March 13, 1925. Serial No. 15,175.

*To all whom it may concern:*

Be it known that we, JAY D. PETERS and NELS P. PALLESEN, citizens of the United States, and residents of Marcus, in the county of Cherokee and State of Iowa, have invented certain new and useful Improvements in Snowplows, of which the following is a specification.

Our invention relates to snow plows of the type commonly termed rotary snow plows, and it is our object to provide such a plow of simple, durable and inexpensive construction.

More particularly, our invention is embodied in an attachment for a common type of tractor, comprising a novel and simple frame construction adapted to be fixed to such tractor, and a unitary scoop and discharge blower structure pivotally mounted in said frame to allow raising and lowering of the scoop, the blower being driven directly from the crank shaft of the tractor by a universal driving link.

Another object is to provide such a snow plow in which the scoop is formed partially enclosed, so that a suction will be created by the blower acting upon the snow at a distance from the blower and tending to draw the snow within the blower casing.

A further object is to provide a simple and effective means for connecting and bracing the scoop relative to the discharge blower, said means being connected to the blower through the medium of a pair of stub shafts serving to pivot the blower in the frame, thereby transmitting the resistance of the scoop to forward push, directly to the frame instead of to the blower casing.

Another object is to provide means supported by the frame for raising and lowering the scoop.

A further object is to provide an improved scoop construction including a sub-frame, removably attached scoop wings and a removably and adjustably mounted scraper blade.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Fig. 1 is an elevation of our improved snow plow attached to a Fordson tractor, which is shown in broken lines.

Fig. 2 is a similar view in plan.

Fig. 3 is a similar view in front elevation.

Fig. 4 is a detail perspective view of the frame-supporting bracket used on one side of the tractor.

Fig. 5 is a detail view showing the driving attachment to the crank shaft of the tractor.

Fig. 6 is a detail horizontal sectional view through the forward portion of the frame and a portion of the scoop and lower structure.

Fig. 7 is a vertical sectional view through the blower, taken on the line 7—7 of Fig. 6.

Fig. 8 is a detail sectional view, taken on the line 8—8 of Fig. 2.

Fig. 9 is a detail sectional view, taken on the line 9—9 of Fig. 7.

Fig. 10 is a detail sectional view illustrating the bracket used on the other side of the engine from that shown in Fig. 4, taken on the line 10—10 of Fig. 2.

Fig. 11 shows a wing extension attachable to the scoop wings.

In Figs. 1, 2 and 3, we have indicated in broken lines the ordinary Ford tractor, which has the front wheels, 10, rear wheels, 11, engine housing, 12, crank case, 13, transmission housing, 14, and radiator, 15. The time gear case, 16, has a flange, 17, which is bolted to a flange, 18, formed on the engine housing, 12, by means of bolts, 19. (See Fig. 4.) The engine housing, 12, is similarly connected to the transmission housing, 14, by means of flanges, 20 and 21, formed on the housings, 12 and 14, respectively.

We provide a pair of frame members, 22 and 23, of channel iron, which are secured to the tractor through the medium of brackets, 24, 25, and 25ª, respectively. (See Figs. 4 and 10.) The bracket, 24, has the arms, 26, provided with openings to receive the bolts, 19, and curved to fit the contour of the casing, 16. The bracket, 25ª, used at the forward end of the engine on the side shown in Fig. 2 has the arms, 26ª, bowed out, as shown, to encircle the water outlet channel, 27, formed on that side of the engine.

Each of the brackets, 24, 25 and 25ª, is bent at right angles to form the arms, 28, to which are secured the channel frame members, 22 and 23, respectively. The forward ends of the channels, 22 and 23, are bent outwardly, as at 29, at a point sufficiently forward to just clear the wheels, 10, of the tractor, and are thence bent forwardly as at 30. In the ends of the arms, 30, are bolted the journal blocks, 31, which are provided with openings to receive the stub shaft ends of a spider, A, (see Fig. 7), which forms a support for the scoop end blower mechanism, which will now be described.

The spider, A, is preferably a malleable casting, having the radiating arms, 32, extending vertically, and the similar arms, 33, extending horizontally. The arms, 33, are provided at their ends with integral stub shafts, 34, journaled in the blocks, 31. The frame is united by an inverted yoke, 35, which straddles the radiator, 15, and serves the further purpose of supporting part of the hoisting apparatus which will hereinafter be described. The yoke, 35, is braced to the channel members, 22 and 23, by braces, 36.

It will now be seen that the frame may be quickly attached or detached from the tractor without separating the frame from the spider, A, and the entire plow attachment may thus be stored intact.

To the arms, 32 and 33, of the spider is secured the rear head, 36, of the drum-shaped blower housing, B. The cylinder of the drum is formed of a sheet of metal, 37, secured to the out-turned peripheral flanges, 38, on the head, 36, by means of rivets or the like. The front side of the casing is a ring-shaped plate, 39, secured to the cylinder, 36, in like manner to that of the head, 36.

We have used the reference character, C, to designate generally the scoop, which is shown in plan view in Fig. 2. The frame work of the scoop, C, is a bed plate, 40, which is V-shaped in plan and dished so that the planes of the faces of its two diverging arms are inclined downwardly and inwardly, as shown in Fig. 8.

The bed plate, 40, is secured to the spider, A, in such manner that it is positioned fixedly relative to the blower housing, B, and yet does not transmit any strain thereto, as I will now explain.

A pair of arms, 41, having sleeves, 42, received over the stub shafts, 34, between the arms, 30, and the blower housing, B, and pinned thereto as at 43, support each a pair of brace arms, 44 and 45. The arms, 44, are extended to the forward extremity of the bed plate, 40, and secured thereto as at 46. The arms, 45, are bent inwardly, as shown in Fig. 6, and secured to the bed plate, 40, near the rear extremity thereof, as at 47.

The wings, 50, of the scoop are formed of a piece or pieces of sheet metal, merging into a substantially cone-shaped hood portion, 48, provided with an out-turned peripheral flange, 49, received within the opening of the front wall, 39, of the blower housing, B, and riveted or otherwise suitably secured to the ring, 39.

The wings proper, 50, are curved in accordance with the ordinary snow scraping blade, so as to give the proper rolling action to the snow as it is carried rearwardly into the scoop. The lower edges of the wings, 50, are secured to the bed plate, 40, by means of strips, 51, and screws, 52, shown in Fig. 8. The upper edges of the wings, 50, are aligned substantially vertically above the lower edges.

Scraper blades, 53, are adjustably secured to the bed plate, 40, by means of bolts, 54, extending through slots, 55, in the bed plate. The plates are secured to the upper faces of the bed plate in order to provide a smooth, sliding surface for the snow, and this surface is continued by the strips, 51.

As shown in Fig. 11, extensions, D, may be provided and secured to the scoop, 50, by means of the bolts, 54.

We provide at the rear extremity of the base plate and at the forward ends thereof, shoes, 56, which normally ride upon the surface of the earth or roadway when the blower is in action. It will be noted that the blower housing, B, is positioned substantially above the level of the shoes, 56, so that should the scraper ride over a small obstruction the lower housing would not be dented or injured thereby. However, in many cases it is necessary to lift the entire scoop in order that the blade may not contact with an obstruction which would injure the blade, and for this purpose we provide the following described raising mechanism.

A lever, 57, is pivoted at 58 to the rear ends of each frame member, 22 and 23, and has a pawl mechanism, 59, coacting with a sector, 60, to lock the lever in any adjusted position. This is of common construction and is not illustrated in detail.

A cable, 61, is pivotally secured to each lever, 57, and extends over a pulley, indicated at 62 in Fig. 3, secured in either side of the yoke, 35, near the top thereof, and thence extends to the forward end of its respective arm, 44, and is secured thereto as at 63.

We find that by providing two levers and two cables it is easier to balance the weight of the scoop and the scoop may be raised with less strain upon its frame and upon the spider, A. By moving the levers, 57, simultaneously to the rear it will be seen that the scoop may be raised.

The spider, A, is provided with an elongated rearwardly-projecting boss, 64, hollowed to receive a shaft, 65, and roller bearings, 66. A shaft, 65, extends into the housing, B, and is provided with a hub, 67, having the two lugs, 68, to which are secured arms, 69. To the ends of the arms, 69, are secured the fan blades, 70, which are of such size as to fill the space surrounding the opening in the ring, 39.

In order to drive the blower we replace the ordinary tractor crank with a shaft, 71, squared as at 72 on its outer end, to receive the squared socket, 73, of a universal coupling, 74. A universal link, 75, connects the coupling, 74, with a similar coupling on the end of the shaft, 65.

It will be seen that as the scoop is raised and lowered the shaft, 65, will be correspondingly lowered or raised, and as a result the distance between the end thereof and the shaft, 71, will vary. This variation is allowed by the sliding coupling, 74.

A discharge pipe, 76, is secured, as shown in Fig. 1, to the housing, B, and at its upper edge is provided with an out-turned flange, 77, having a series of equally spaced notches, 78, in its periphery. An elbow, 79, has a flange, 80, crimped over the flange, 77, and provided with an opening through which a pin, 81, may be extended to engage any of the slots, 78, and thereby lock the elbow, 79, in any desired position. Thus advantage may be taken of the direction of the wind in discharging snow from the boiler, and one of the objections to the rotary type plow thus eliminated.

Most of the rotary blowers now in use utilize the rotating fan blades only to throw the snow after it has been delivered thereto. In some of them expensive and cumbersome conveying mechanism is utilized to convey the snow entirely to the mouth of the blower.

It has been our idea to simplify the construction by utilizing the blower both as a discharge mechanism and also as a suction agent to draw the snow upwardly into the blower housing and thus prevent clogging of the snow in the necessarily restricted opening into said housing. To accomplish this object we have closed the scoop, as described in the portion, 48, which, it will be noted, extends forwardly to the blade portion or the point at which the snow commences to elevate into the blower. Thus the suction of the blade is extended practically to the point at which the elevation commences, and we provide a fan which is of sufficient strength to accomplish this elevation, aided by the pressure of the snow which is being gathered by the wings, 50, and is being crowded rearwardly.

To utilize such a scoop having an enclosed hood portion, we find that it is preferable to form the hood and blower casing integral as described.

In order to provide for the proper raising of the scoop, we then provide the spider construction which simultaneously braces and supports the blower housing and the scoop frame.

By positioning the spider at the rear side of the blower housing the opening is thus left unobstructed, and the long rearwardly-extending boss, 64, may be provided whereby a single bearing serves to support the shaft, 65. In addition, the axis of movement of the scoop may be thus brought fairly close to the rear end of the shaft, 65, so as to minimize the amount of play necessary between the shaft, 72, and the coupling, 74. To attain this object the stub shafts, 34, might be bent further rearwardly than as shown.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. In a snow plow, a frame having a pair of forwardly-extending laterally-spaced arms, a unitary scoop and blower structure pivotally mounted in said arms for vertically swinging movement including a blower housing, a fan rotatably mounted in said housing, and means for driving said fan so as to create a suction within the housing by centrifugal action, the scoop being provided with a completely enclosed hood portion communicating with the blower housing at the center of said housing, and extending substantially forwardly therefrom.

2. In a snow plow, a frame having a pair of forwardly-extending laterally-spaced arms, a unitary scoop and blower structure pivotally mounted in said arms for vertically swinging movement including a blower housing, a fan rotatably mounted in said housing, and means for driving said fan so as to create a suction within the housing by centrifugal action, the scoop being provided with a completely enclosed hood portion communicating with the blower housing and extending substantially forwardly therefrom at the center of said housing and said scoop being provided with diverging wings for gathering the snow and conveying it to said hood portion.

3. In a snow plow, in combination with a tractor having an engine housing, a transmission housing and a time gear case secured together by means of bolted flanges, a snow plow frame comprising a pair of side frame members secured together by an inverted yoke straddling the forward portion of the tractor and embracing the sides of the tractor closely adjacent thereto, a pair of brackets having openings positioned to receive the flange bolts of the respective time gear case and the transmission housing, respectively, said side frame members being secured to said brackets, and a blower housing pivotally secured between the forward ends of said side frame members.

4. In a snow plow, in combination with a tractor having a crank shaft, a snow plow frame including a pair of side frame members secured to said tractor longitudinally along the sides thereof, a unitary scoop and blower housing structure, pivotally mounted between the forward ends of said side frame members, a rotating fan within said blower housing, means for driving said fan from the tractor crank shaft, means for elevating said combined scoop and blower housing structure comprising a yoke-shaped member secured to a snow plow frame and straddling the tractor, pulleys mounted in said yoke-shaped frame, levers mounted at the rear ends of said side frame members, and cables secured to the forward ends of said scoop and blower housing structure extending over said pulleys and secured to said levers.

5. In a snow plow, a frame having a pair of forwardly-extending arms, a blower housing pivotally mounted between said arms by means of a shaft fixed to said housing, a scoop comprising a bed plate of V-shape, having downwardly and inwardly inclined faces, scraper blades removably secured to said bed plate, scraper wings secured to said bed plate and to said blower housing, and braces fixed to said bed plate and extending rearwardly and fixed to said shaft, thereby rigidly attaching the scoop and blower housing together.

6. In a snow plow, a frame having a pair of forwardly-extending, spaced arms, a spider having trunnions at its ends journalled in said arms, a blower housing having a rear wall secured to said spider, a blower shaft extending through said rear wall and journalled in the spider, a fan mounted on said shaft within the housing, a scoop communicating with the blower housing and rigidly attached thereto, and means for swinging said scoop and housing around the axis of said spider trunnions.

7. In a snow plow, a frame having a pair of forwardly-extending arms, a blower housing pivotally mounted between said arms by means of a shaft fixed to said housing, a scoop comprising a bed plate of V-shape, having downwardly and inwardly inclined faces, scraper blades removably secured to said bed plate, scraper wings secured to said bed plate and to said blower housing, braces fixed to said bed plate and extending rearwardly and fixed to said shaft, thereby rigidly attaching the scoop and blower housing together, and means for swinging said scoop and housing around the axis of said spider trunnions.

8. In a snow plow, a frame having a pair of forwardly-extending arms, a spider having trunnions at its ends journalled in said arms, a blower housing having a rear wall secured to said spider, a blower shaft journalled in said spider and extending into said housing through said rear wall, a fan secured to said blower shaft, a scoop including a V-shaped bed plate, wings secured to said bed plate and to the blower housing, and brace arms secured to said bed plate and to the spider on either side of the housing.

9. In a snow plow, a frame having a pair of forwardly-extending arms, a blower housing pivotally mounted between said arms by means of a shaft fixed to said housing, a scoop comprising a bed plate of V-shape, having downwardly and inwardly inclined faces, scraper blades removably secured to said bed plate, scraper wings secured to said bed plate and to said blower housing, braces fixed to said bed plate and extending rearwardly and fixed to said shaft, thereby rigidly attaching the scoop and blower housing together, means for swinging said scoop and housing around the axis of said spider trunnions, and means for raising the scoop, comprising an arch secured between the arms of the frame, pulleys on said arch, cables extending over said pulleys and secured at their forward ends to the bed plate, and levers fulcrumed on the arms of the frame rearwardly of said arch, the rear ends of the cables being secured to said levers.

Signed at Marcus, in the county of Cherokee, and State of Iowa, this 9th day of March, 1925.

JAY D. PETERS.
NELS P. PALLESEN.